(12) United States Patent
Schuebel et al.

(10) Patent No.: US 6,244,796 B1
(45) Date of Patent: Jun. 12, 2001

(54) REMOVABLE GUIDE ATTACHMENT APPARATUS

(75) Inventors: Jennifer J. Schuebel, Racine, WI (US); Mark D. Duennes, Glenview, IL (US)

(73) Assignee: S-B Power Tool Company, Chicago, IL (US)

( * ) Notice: Subject to any disclaimer, the term of this patent is extended or adjusted under 35 U.S.C. 154(b) by 0 days.

(21) Appl. No.: 09/373,687

(22) Filed: Aug. 13, 1999

(51) Int. Cl.[7] .................................. B23C 1/20; B27C 5/10
(52) U.S. Cl. ..................... 409/180; 409/134; 144/136.95; 144/154.5; 299/39.9
(58) Field of Search ...................... 409/180, 134, 409/178, 175, 181, 182; 144/136.95, 154.5, 371; 299/39.9, 39.1

(56) References Cited

U.S. PATENT DOCUMENTS

| | | | |
|---|---|---|---|
| 1,923,159 | 8/1933 | McLaren | 72/138 |
| 2,146,458 * | 2/1939 | Willard et al. | 409/182 |
| 2,657,719 * | 11/1953 | Forsberg | 30/376 |
| 2,721,502 * | 10/1955 | Adams | 409/182 |
| 3,212,541 * | 10/1965 | Burrows et al. | 144/136.95 |
| 3,285,135 | 11/1966 | Shaw | 90/12 |
| 3,312,258 * | 4/1967 | Spampinato | 144/134.1 |
| 3,492,896 * | 2/1970 | Croft | 409/175 |
| 3,762,452 | 10/1973 | Bernald | 144/134 |
| 4,155,383 | 5/1979 | Welliver | 144/134 |
| 4,273,483 * | 6/1981 | Mendicino | 409/178 |
| 4,290,464 * | 9/1981 | Marsan | 144/136.95 |
| 4,655,653 * | 4/1987 | Hall et al. | 409/182 |
| 4,674,927 * | 6/1987 | Khurana | 408/56 |
| 4,993,897 | 2/1991 | Anderhalden | 409/180 |
| 5,829,931 | 11/1998 | Doumani | 409/132 |
| 6,059,475 * | 5/2000 | Jafarmadar | 401/140 |

OTHER PUBLICATIONS

Dremel Catalog; p. 21, "Cutting Kits" and Tile "Cutting Kit"; Sep. 1998.
Printout from http://www.dremel.com/whatsnew/whatsnew.html, Jun. 2000.*

* cited by examiner

*Primary Examiner*—A. L. Wellington
*Assistant Examiner*—Erica Ergenbright
(74) *Attorney, Agent, or Firm*—Greer, Burns & Crain, Ltd

(57) ABSTRACT

A guide attachment apparatus for guiding a rotary hand tool of the type which includes an outer enclosure, a rotatable collet adapted to retain a bit adapted for removing grout from a work surface or other activity. The guide attachment apparatus includes a housing and a slide. The housing has a lower portion and an upper portion, with the lower portion having a base that is located in a plane which is at an acute angle from the axis of rotation. The housing further includes a viewing opening, for viewing the bit as it engages a work surface, an opening for receiving the slide, and a locking mechanism for locking the slide in a position relative to the housing. The slide is attachable to the housing and also includes a coupling mechanism to couple the slide to the rotary hand tool.

13 Claims, 3 Drawing Sheets

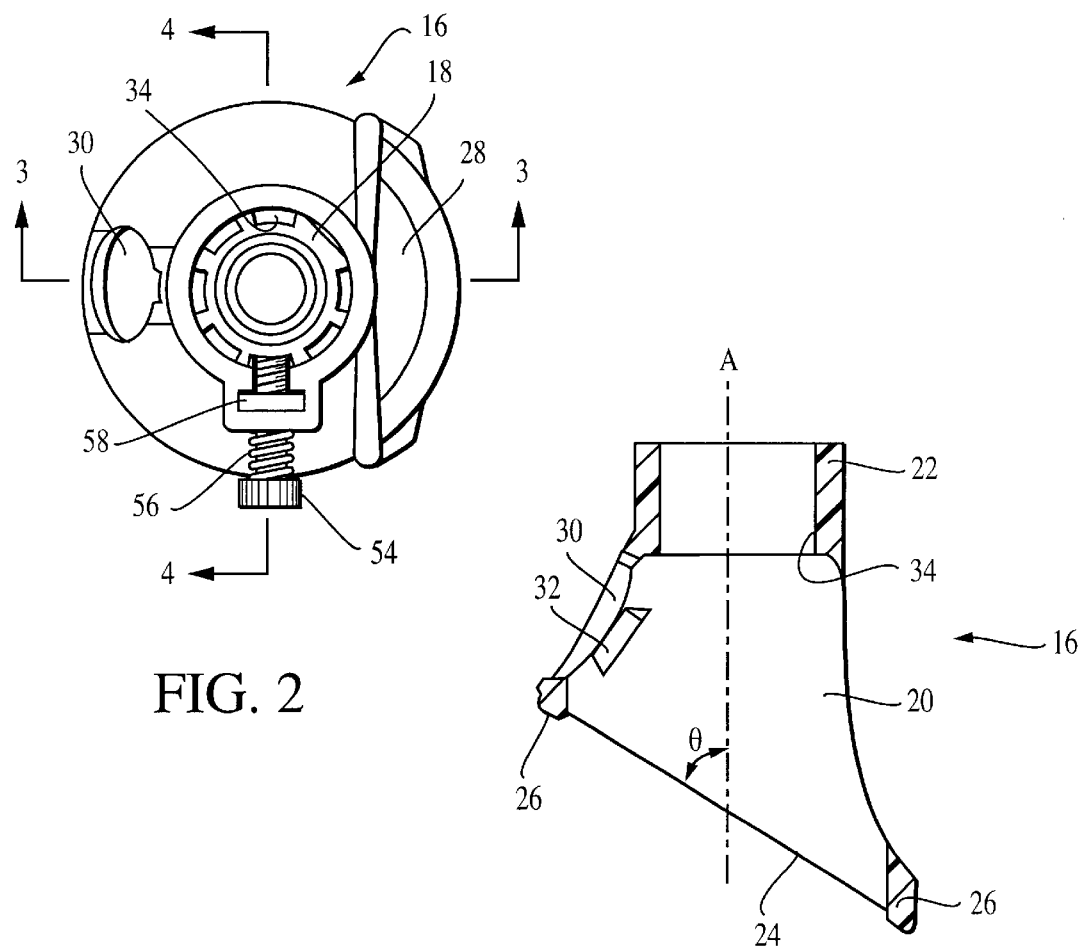
FIG. 2
FIG. 3
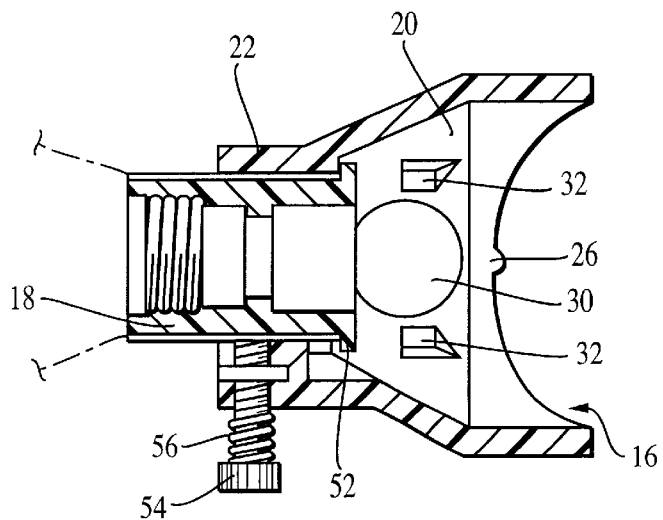
FIG. 4

REMOVABLE GUIDE ATTACHMENT APPARATUS

BACKGROUND

The present invention relates generally to a removable guide attachment apparatus for use with a rotary hand tool. More specifically, the present invention relates to a removable guide attachment apparatus, which preferably includes a housing and a slide, the housing having an angled base portion.

Various types of guide attachment assemblies are currently known. One well known device utilizes two separate components, a housing and a slide, where the slide is coupled to a hand drill or other rotary hand tool, and the slide and housing can be locked in various positions. This guide attachment apparatus is adapted for use with such a rotary tool of the type which utilizes a motor to rotate a collet about an axis. A bit is inserted in and held by the collet and for engaging a work surface.

The housing of this known guide attachment includes a base portion which is perpendicular to the axis. This perpendicular arrangement can make for a difficult or uncomfortable handling during use, since the user's hand is perpendicular to the base, not at a more natural acute angle. While the housing of this guide includes a viewing opening to allow the user to see the bit as it engages the work surface, the viewing opening is rather small and allows the user only a limited view of the bit. Also, the housing base lacks any guides to help keep the bit centered on the work surface, making it easy for the bit to wander off the center of the desired work surface.

Accordingly, in response to the problems discussed above, a primary object of the present invention is to provide an improved guide attachment apparatus for a rotary hand tool, where the present guide attachment apparatus includes a housing having a base portion which is at an acute angle relative to the axis of rotation of the collet, which enables a user to have a more natural hold of the rotary hand tool.

Another object of the present invention is to provide such an improved guide attachment apparatus which has a large viewing hole for viewing the bit engaging the work surface.

Yet another object of the present invention is to provide an improved guide attachment apparatus which includes guide protrusions on the base of the housing that are particularly useful to guide the bit between adjacent tiles during a grout removing operation.

A further object of the present invention is to provide an improved guide attachment apparatus which includes multiple locking recesses on the slide to allow the user to see the depth indicator at different work angles.

These and other objects of the present invention will be apparent from the following detailed description of the invention, while referring to the attached drawings in which:

FIG. 2 is a top view of a housing of the present guide attachment apparatus;

FIG. 3 is a sectional view of the housing, taken along the lines 3—3 of FIG. 2;

FIG. 4 is a sectional view of the housing, taken along the lines 4—4 of FIG. 2;

SUMMARY OF THE INVENTION

The above-listed objects are met or exceeded by the present apparatus that provides an improved guide attachment apparatus for connecting to either a rotary hand tool of the type which has a motor for rotating a collet about an axis and a bit mounted in the collet. The present guide attachment apparatus is for aiding the user in guiding the bit engaging a work surface. Generally, the present invention comprises a guide attachment apparatus that includes a housing and a slide.

More specifically, the present invention is a guide attachment apparatus for guiding a bit secured in a collet of a powered rotary hand tool of the type that rotates the collet about an axis. The guide attachment is made of two pieces, a housing and a slide. The slide includes a coupler for attaching the slide to the tool. The housing has a base portion which is located in a plane that is at an acute angle from the rotational axis. The housing also includes a large viewing opening to enable the user to see the bit engaging the work surface, and another opening for freely receiving the slide. By utilizing a locking mechanism on the housing, the slide can be locked in various positions relative to the housing which selectively controls the depth of operation of the bit relative to the work surface.

The housing of the preferred embodiment of the present guide attachment apparatus also includes two guide protrusions located 180 degrees apart on the base portion of the housing that are adapted to engage a recess in the work surface for guiding the bit and keeping it centered on the work surface. Also, preferably included on the housing is a hook opening with two recesses on either side for hooking the guide attachment apparatus to a wall for safekeeping while not in use. The slide in the preferred embodiment also includes a depth indicator so that a user knows at what depth the bit is positioned in the work surface.

DETAILED DESCRIPTION OF THE PREFERRED EMBODIMENT

Figure 1:
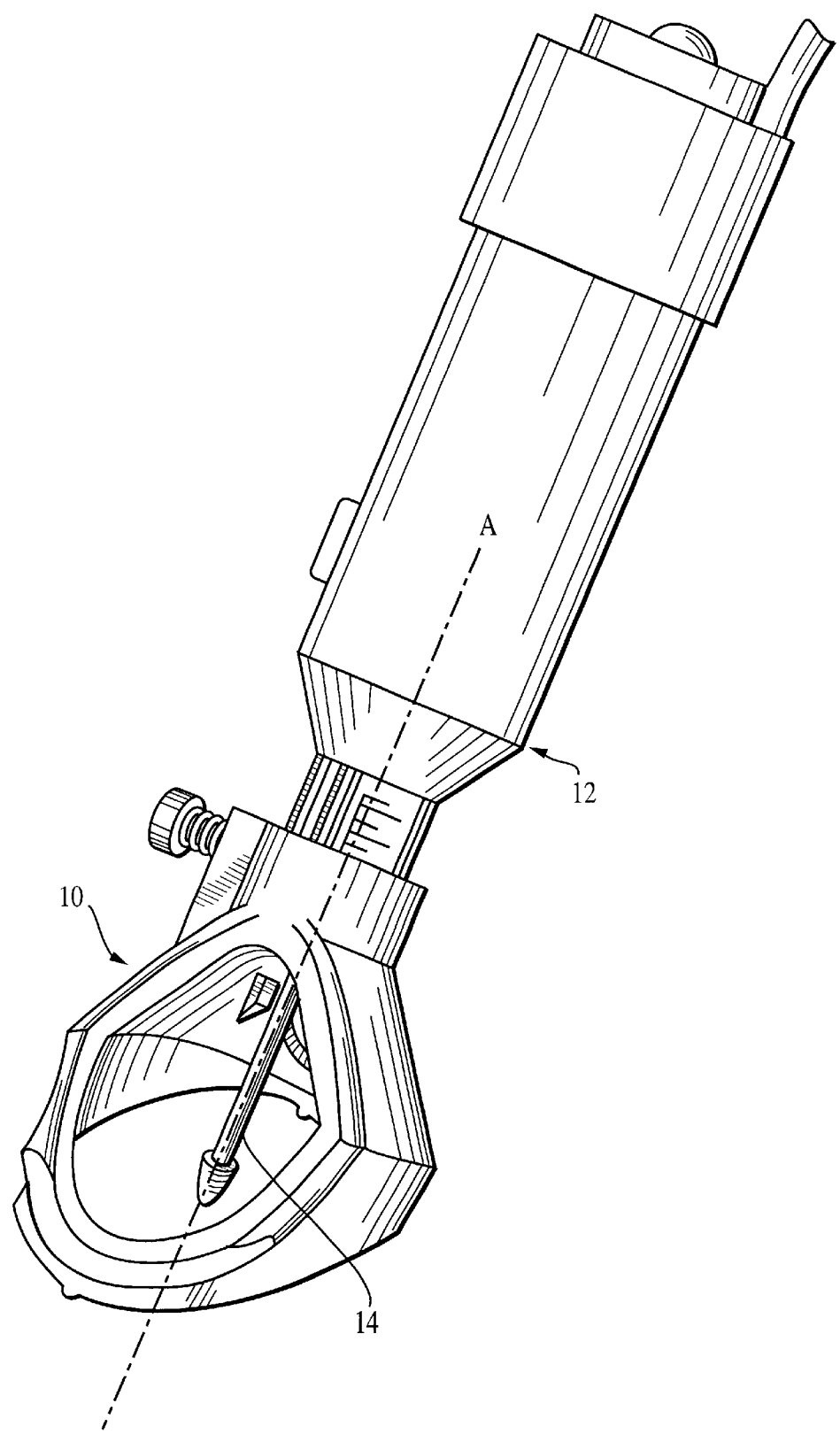
FIG. 1 is a perspective view of the rotary hand tool having the guide attachment apparatus of the present invention, shown attached to a rotary hand tool having a grout removal bit.

Referring now to the drawings, the preferred embodiment of the present guide attachment apparatus is shown in FIGS. 1–6, with FIG. 1 showing a preferred embodiment of the present guide attachment apparatus, generally indicated at 10, attached to a rotary hand tool, generally indicated at 12. The tool 12 includes a collet (not shown) and is shown having a bit 14 held by the collet for engaging a work surface. The rotary hand tool 12 is of the type having an electric motor (not shown) such that it rotates the collet around an axis A. The hand tool may be a rotary hand tool such as those marketed under the Dremel brand made by the SB Tool Company of Chicago, Ill. The tool may also be an electric drill or other rotary tool, provided that the tool has a stationary portion adjacent the collet so that the apparatus can be attached to the tool.

While the apparatus of the present invention is susceptible of many uses, it is particularly adapted from removing grout from a work surface such as bathroom, kitchen and floor tile. Such tiles often have grout placed between adjacent tiles which periodically needs to be replaced. The present invention is adapted to be used with a rotary tool and a bit placed in the tool and the present invention can be adjusted to achieve the desired depth of penetration by the bit in the grout so that new grout can be installed. By controlling the depth of penetration, the underlying supporting surface to which the tile is installed should not be damaged when the grout is removed.

Turning now to FIGS. 2–6, the guide attachment apparatus 10 is shown disengaged from the rotary hand tool 12, to better describe the primary features and advantages of the present guide attachment apparatus. The guide attachment apparatus is made of two pieces, a housing 16 and a slide 18. Both of the housing and the slide are preferably made of a plastic or other light weight durable material.

In FIGS. 2–4, the preferred embodiment of the housing 16 is shown to include a lower portion 20 and an upper portion 22, the lower portion 20 of which is generally conical in shape. The lower portion 20 also includes a base portion 24 which is located in a plane that is at an acute angle Θ from the axis of rotation A (best shown in FIG. 3). In the preferred embodiment, the base portion 24 is angled about 60 degrees from the axis of rotation A. Preferably, the length of the housing is approximately 36 to 40 mm at its shortest end and approximately 75 to 79 mm on the longest end, although other length ranges are contemplated. This angled base portion 24 allows the user to comfortably hold the rotary hand tool 12 while working on any surface, such as a floor, wall or ceiling.

Also included on the base portion 24 are two guide protrusions 26. The guide protrusions 26 are preferably located 180 degrees apart from each other, one located on the longest end and the other on the shortest end. These guide protrusions 26 are adapted to engage a grout retaining recess between adjacent tiles and keep the bit 14 in a centered position in the recess, which facilitates easy and uniform grout removal by a user.

On a side of the lower portion is a viewing opening 28. In the preferred embodiment, the viewing opening 28 is almost the entire length of both the lower portion 20 and the upper portion 22 of the housing 16, and is located on the longer end of the housing. This allows the user to easily see the bit 14 as it engages the work surface. The viewing opening 28 of the present guide attachment apparatus 10 is much larger than those of the prior art, thus giving the user a better view of the bit 14.

A hook opening 30 is preferably located opposite of the viewing opening 28, and in the preferred embodiment has a diameter of 15 to 20 mm, although other sizes are contemplated. The hook opening 30 allows the user to hang the guide attachment apparatus 10 on a hook when it is not in use. Two internal recesses 32 are included in the preferred embodiment on either side of the hook opening 30 to aid the user in hanging the apparatus 10.

The upper portion 22 of the housing 16 is preferably generally cylindrical in shape and has a slide receiving opening 34. The slide receiving opening 34 is for freely receiving the slide 18 and has a diameter in the range of preferably 23 to 27 mm in the preferred embodiment. The upper portion 22 also includes a locking mechanism 36 for adjustably locking the slide relative to the housing.

Figure 6:
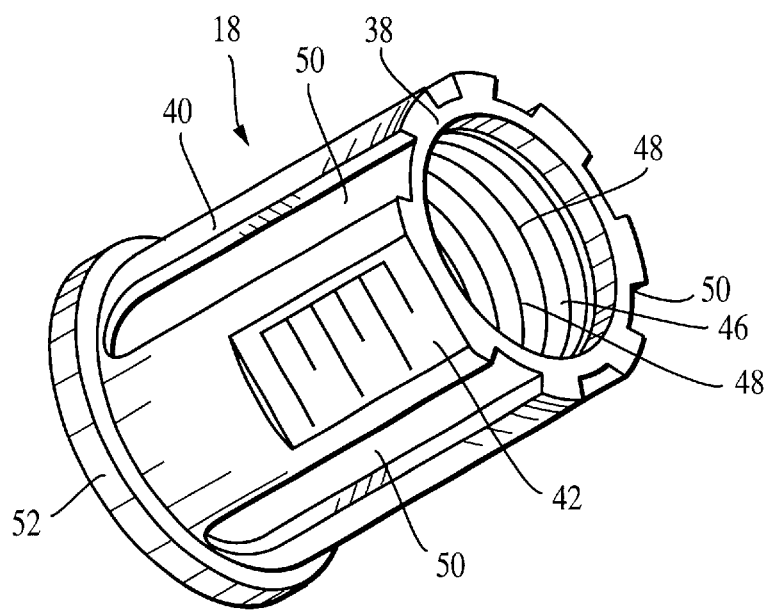

Turning now to FIG. 6, which illustrates the preferred embodiment of the slide 18, it is shown to comprise a generally hollow cylinder and has a top portion 38 and a lower portion 40. Preferably, the slide is approximately 32 to 35 mm in length, although other lengths are contemplated. The slide 18 includes a depth indicator panel 42 on the top portion 38 of the slide 18. In the preferred embodiment, the depth indicator panel 42 has indicia 44 consisting of lines and numerical markings painted on the panel 42 (markings not shown) at roughly 2 to 3 mm intervals for 10 to 15 mm, although the indicia may be formed on the panel 42 during the molding process, or such can be cut or otherwise made in the panel surface. Also, the panel 42 is preferably 17 to 20 mm in length, although other sizes are contemplated. It is also contemplated that only lines will be used, with the markings indicating depth of the bit 14, so the user can know how deep the bit will engage the work surface before work begins.

Also, the top portion 38 of the slide 18 includes an internal coupling mechanism 46 that is adapted to attach the apparatus 10 to the rotary hand tool 12. In the preferred embodiment, the coupling mechanism 46 includes a series of internal threads 48 in the slide 18 that are adapted to engage corresponding external threads located on the rotary hand tool 12. The use of the threads 48 allows for the easy attachment and removal of the guide attachment apparatus 10 to the rotary hand tool 12.

The slide 18 also includes a plurality of longitudinal recesses 50 arranged around the slide's circumference. Preferably, seven recesses are located around the circumference, although other arrangements are considered. These recesses 50 are for use with the locking mechanism 36 for adjustably positioning the apparatus to achieve the desired depth of penetration of the bit into the work surface.

An outwardly extending flange 52 is provided on the lower portion 40 of the slide 18 which is adapted to engage the upper portion 22 of the housing 16 and keeps the slide 18 from being pulled completely out of the housing.

Figure 5:
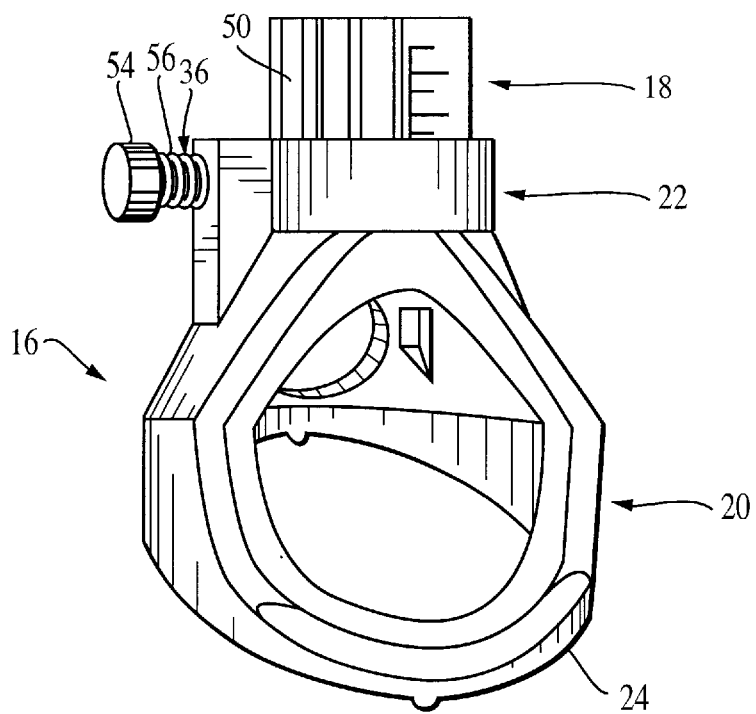
FIG. 5 is a side view of the present guide attachment apparatus, with the housing shown attached to a slide; and, FIG. 6 is a side view of the slide unattached from the housing portion of the guide apparatus.

Turning now to FIG. 5, the locking mechanism 36 allows the user to lock the slide 18 in a fixed position relative to the housing 16. The locking mechanism 36 preferably includes a threaded bolt with an enlarged knob 54 which is biased away from the housing 16 by a coil spring 56. Further holding the threaded bolt 54 in place is a square nut (not shown) that is retained in a recess 58. The threaded bolt 54 is preferably about 15 to 20 mm in length, not including the knob portion. The threaded bolt 54 is turned until it abuts the base wall surface of one of the longitudinal recesses 50 of the slide 18 to tightly lock the slide 18 to the housing. The use of a plurality of longitudinal recesses 50 allows the user to position the slide 18 in a plurality of different angular orientations, which can provide the user with an angular preference.

While a preferred embodiment of the present invention has been shown and described, it should be understood that other modifications, substitutions and alternatives are apparent to one of ordinary skill in the art. Such modifications, substitutions and alternatives can be made without departing from the spirit and scope of the invention, which should be determined from the appended claims.

Various features of the present invention are set forth in the following claims.

What is claimed is:

1. A removable guide attachment apparatus for a rotary hand tool of the type which has an outer enclosure, a rotating collet rotating about an axis and a bit mounted in the collet for engaging a work surface, said apparatus comprising:

a slide including a means for coupling said slide to the rotary hand tool;

a housing having a base portion located in a plane which is at an acute angle relative to the rotating axis, an opening for receiving said slide, a locking means for locking said slide in a plurality of longitudinal positions relative to said housing, and a viewing opening for viewing the bit engaging the working surface, said viewing opening not being intersected by the bit; and at least two guide means located 180 degrees apart on said base portion for guiding the bit and the base portion along the work surface.

2. A removable guide attachment apparatus according to claim 1, wherein said slide is in the form of a generally hollow cylinder.

3. A removable guide attachment apparatus according to claim 1, wherein said slide includes at least one longitudinal recess for engaging said locking means.

4. A removable guide attachment apparatus according to claim 1, wherein said slide includes a plurality of longitudinal recesses located around a circumference of an outer surface of said slide.

5. A removable guide attachment apparatus according to claim 4, wherein said locking means comprises a threaded bolt with an enlarged knob biased away from said housing and engaging a captive nut retained in said housing, whereby said threaded bolt is adapted to abut a base wall surface of one of said longitudinal recesses when rotated into engagement.

6. A removable guide attachment apparatus according to claim 1, wherein said slide further includes a depth indication means for indicating a depth of the bit on the working surface.

7. A removable guide attachment apparatus according to claim 1, wherein said ho using further includes a hook opening on an opposite side of said viewing opening.

8. A removable guide attachment apparatus according to claim 7, wherein said housing further comprises two internal recesses, one of which is located on each side of said hook opening.

9. A removable guide attachment apparatus according to claim 1, wherein said coupling means comprises a plurality of internal threads.

10. A removable guide attachment apparatus according to claim 1, wherein said slide includes an outer flange around a circumference of said slide for engaging an upper portion of said housing and preventing said slide from being pulled outwardly from the housing.

11. A removable guide attachment apparatus according to claim 1, wherein said acute angle is approximately 60 degrees.

12. A removable grout removal guide attachment apparatus for a rotary hand tool of the type which has an outer enclosure, a rotating collet rotating about an axis and a bit mounted in the collet for engaging a work surface, said apparatus comprising:

a slide including a means for coupling said slide to the rotary hand tool; and, a housing having a base portion located in a plane which is at an acute angle relative to the rotational axis, an opening for receiving said slide, a locking means for locking said slide in a plurality of longitudinal and circumferential positions relative to said housing, and a viewing opening for viewing the bit engaging the working surface, said viewing opening not being intersected by the bit, and wherein said base portion engages the work surface.

13. A removable guide attachment apparatus for a rotary tool of the type which has an outer enclosure, a rotating collet rotating about an axis and a bit mounted in the collet for engaging a work surface, said apparatus comprising:

a slide including a plurality of longitudinal recesses located around a circumference of an outer surface of said slide; and a housing having a base portion located in a plane which is at an acute angle relative to the rotating axis, an opening for receiving said slide, a locking means for locking said slide in a plurality of longitudinal positions relative to said housing, said locking means comprising a threaded bolt with an enlarged knob biased away from said housing and engaging a captive nut retained in said housing, whereby said threaded bolt is adapted to abut a base wall surface of one of said longitudinal recesses when rotated into engagement, and a viewing opening for viewing the bit engaging the working surface, said viewing opening not being intersected by the bit.

* * * * *